(12) United States Patent
Yang

(10) Patent No.: US 9,772,001 B2
(45) Date of Patent: Sep. 26, 2017

(54) OVER-LOADING PROTECTION PRESSING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Guang Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 178 days.

(21) Appl. No.: 14/598,839

(22) Filed: Jan. 16, 2015

(65) Prior Publication Data
US 2016/0138669 A1    May 19, 2016

(30) Foreign Application Priority Data
Nov. 14, 2014   (CN) .......................... 2014 1 0641866

(51) Int. Cl.
| B25B 27/00 | (2006.01) |
| F16F 13/00 | (2006.01) |
| B25B 27/02 | (2006.01) |

(52) U.S. Cl.
CPC ............ *F16F 13/005* (2013.01); *B25B 27/02* (2013.01); *F16F 2230/24* (2013.01)

(58) Field of Classification Search
CPC ........ F16F 13/005; B25B 29/00; B25B 27/02; B23P 19/02
See application file for complete search history.

(56) References Cited

U.S. PATENT DOCUMENTS

| 2,421,354 | A | * | 5/1947 | Reiter ...................... A61C 3/08 433/151 |
| 2,437,014 | A | * | 3/1948 | Arnesen ................. A61B 90/00 433/151 |
| 2,725,878 | A | * | 12/1955 | Reiter ................ A61B 17/1604 606/100 |
| 2,960,864 | A | * | 11/1960 | Watts ..................... H01R 43/26 173/202 |
| 3,210,836 | A | * | 10/1965 | Johanson ........... H05K 13/0491 279/51 |
| 3,579,795 | A | * | 5/1971 | Burman ............. H05K 13/0491 219/230 |

(Continued)

*Primary Examiner* — Larry E Waggle, Jr.
*Assistant Examiner* — Tyrone V Hall, Jr.
(74) *Attorney, Agent, or Firm* — Steven Reiss

(57) ABSTRACT

An over-loading protection pressing device adapted for pressing an object includes a housing, a pressing head and a protection portion. The housing has a clamping portion fixed thereon. The pressing head protrudes from the housing, and the pressing head is configured for pressing the object. The protection portion is configured to be received in the housing and coupled to the pressing head via a supporting pole. The protection portion is clamped by the clamping portion. When a pressure along a lengthwise direction of the housing is in a predetermined range, the clamping portion is clipped on a first position of the protection portion; when the pressure is over a predetermined range, the clamping portion can move from the first position to a second position.

18 Claims, 5 Drawing Sheets

(56) References Cited

U.S. PATENT DOCUMENTS

| | | | | | |
|---|---|---|---|---|---|
| 3,699,629 | A | * | 10/1972 | Hood, Jr. | H05K 13/0491 |
| | | | | | 29/278 |
| 4,050,148 | A | * | 9/1977 | Hastings | B25B 27/14 |
| | | | | | 279/155 |
| 4,052,788 | A | * | 10/1977 | Hastings | B25B 27/14 |
| | | | | | 279/155 |
| 4,919,216 | A | * | 4/1990 | Ikegami | B25B 19/00 |
| | | | | | 173/124 |
| 5,722,140 | A | * | 3/1998 | Marshall | A63B 53/02 |
| | | | | | 29/255 |
| 5,735,855 | A | * | 4/1998 | Bradley | A61B 17/151 |
| | | | | | 606/79 |
| 6,370,993 | B1 | * | 4/2002 | Pitstick | B25B 19/00 |
| | | | | | 173/203 |
| 7,121,165 | B2 | * | 10/2006 | Yamakawa | G04D 1/10 |
| | | | | | 173/120 |
| 7,708,739 | B2 | * | 5/2010 | Kilburn | A61B 17/92 |
| | | | | | 606/86 R |
| 7,996,972 | B2 | * | 8/2011 | Hu | B25B 27/026 |
| | | | | | 29/252 |

* cited by examiner

OVER-LOADING PROTECTION PRESSING DEVICE

CROSS-REFERENCE TO RELATED APPLICATIONS

This application claims priority to Chinese patent application no. 201410641866.0 on Nov. 14, 2014, the contents of which are incorporated by reference herein.

FIELD

The subject matter herein generally relates to pressing devices, and particularly to an over-loading protection pressing device.

BACKGROUND

In mechanistic field, a pressing device can be applied to press an accessorial element onto a target object. In operation, a pressing device is always operated under a pressure of a user. However, applying the pressure manually will result in an over-loading and further is labor-consuming and inconvenient.

BRIEF DESCRIPTION OF THE DRAWINGS

Implementations of the present technology will now be described, by way of example only, with reference to the attached figures.

DETAILED DESCRIPTION

Figure 1:
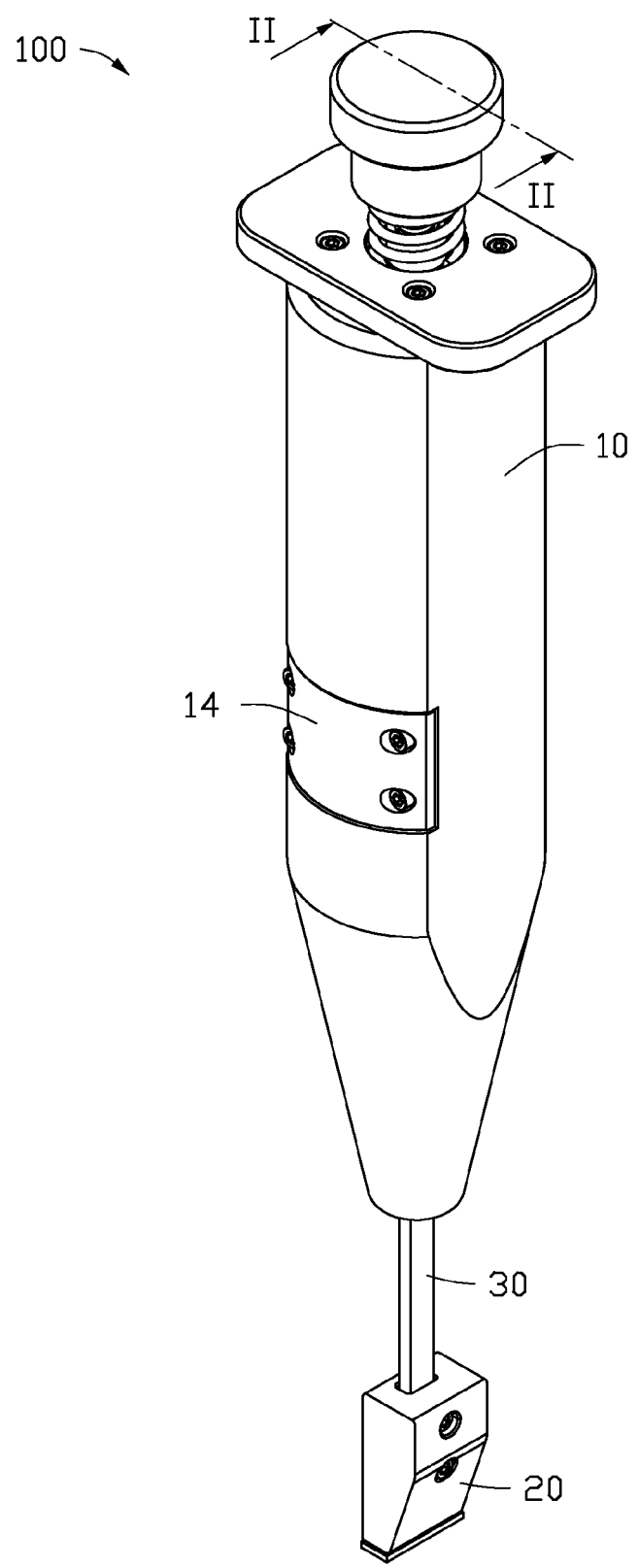
FIG. 1 is an assembled, isometric view of an over-loading protection pressing device in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an over-loading protection pressing device.

Figure 2:
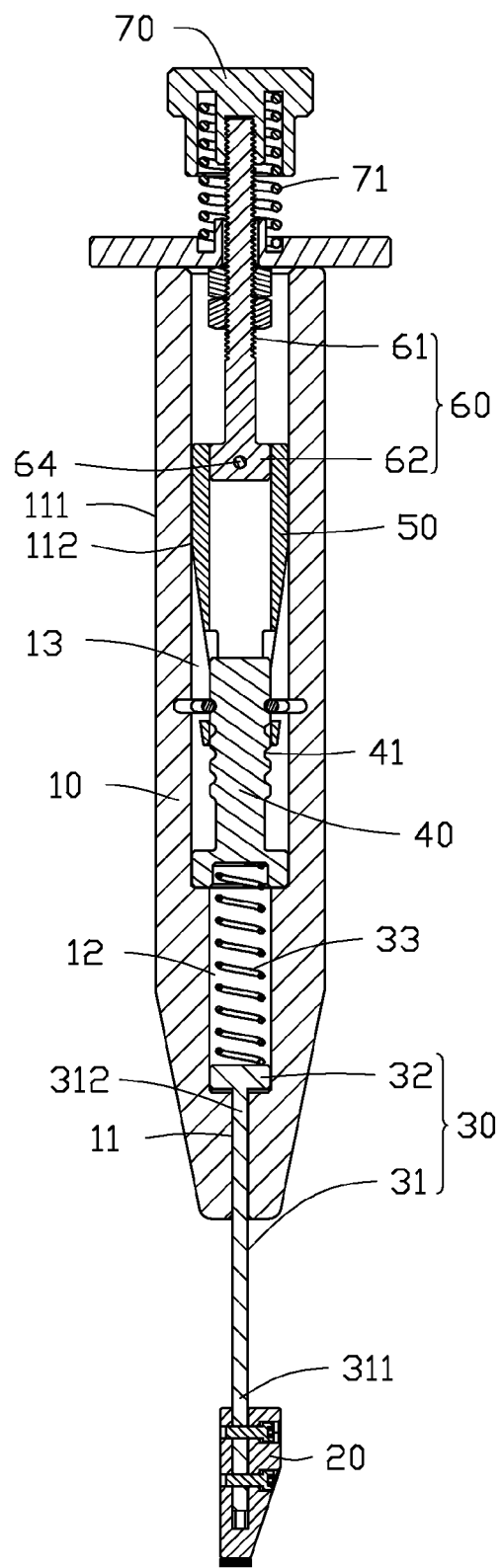
FIG. 2 is a cross-sectional view of the over-loading protection pressing device of FIG. 1, taken along line II-II thereof.
Figure 3:
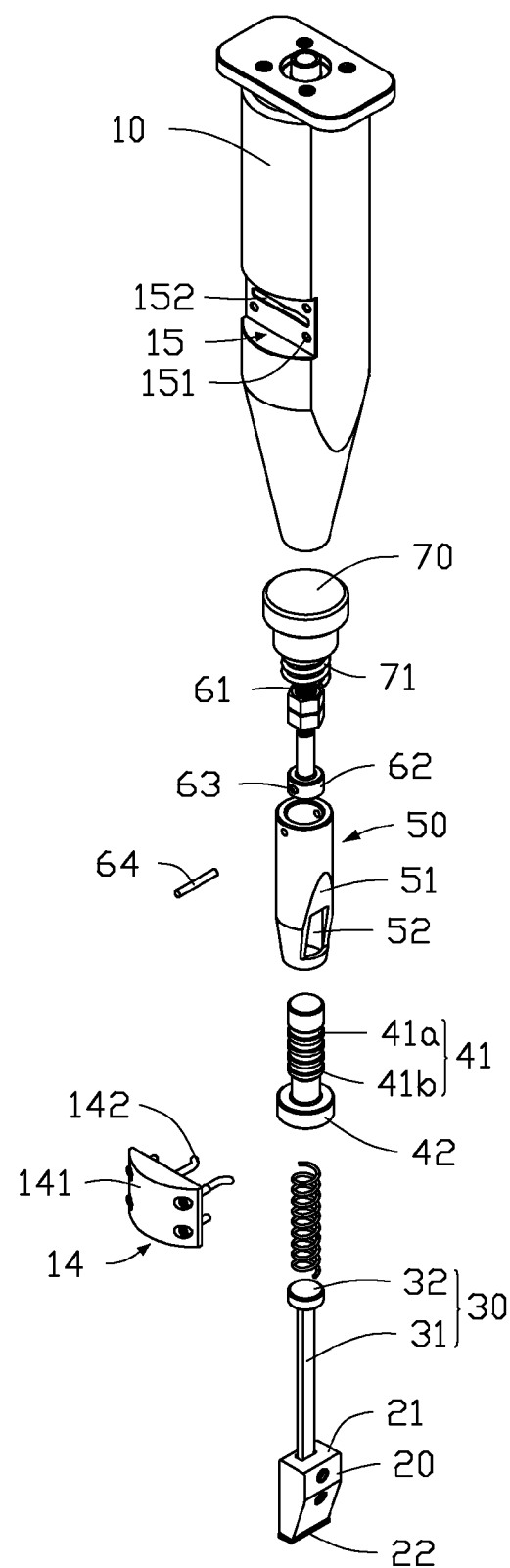
FIG. 3 is similar to FIG. 1, but removing a housing thereof.
Figure 4:
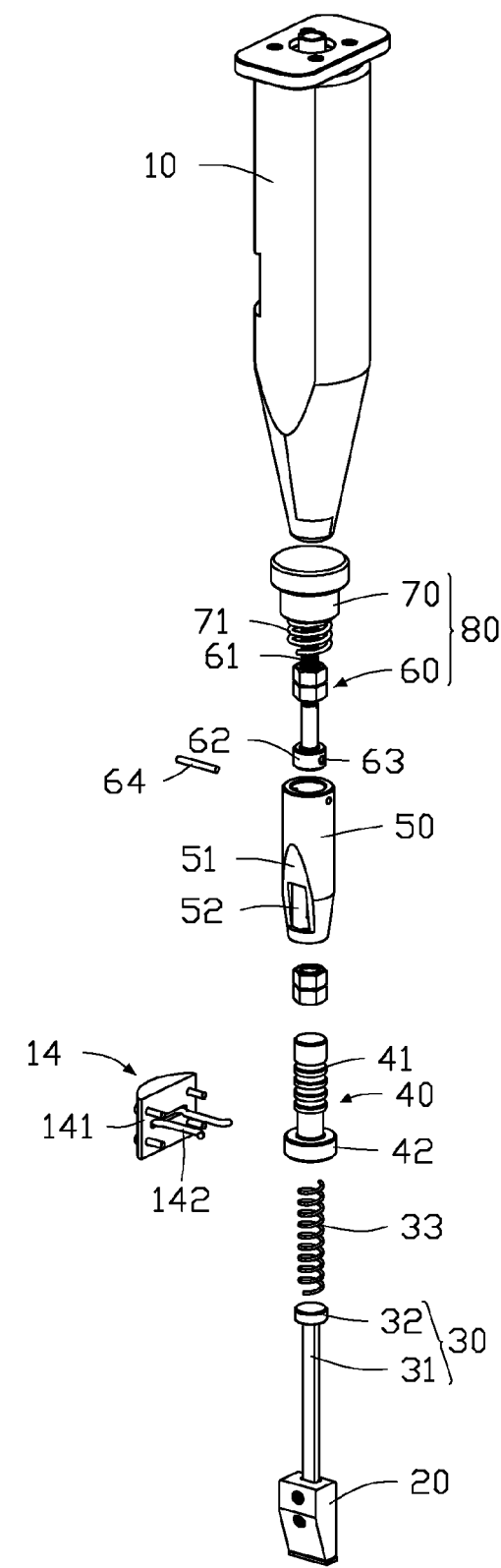
FIG. 4 is an exploded view of the over-loading protection pressing device of FIG. 1.
Figure 5:
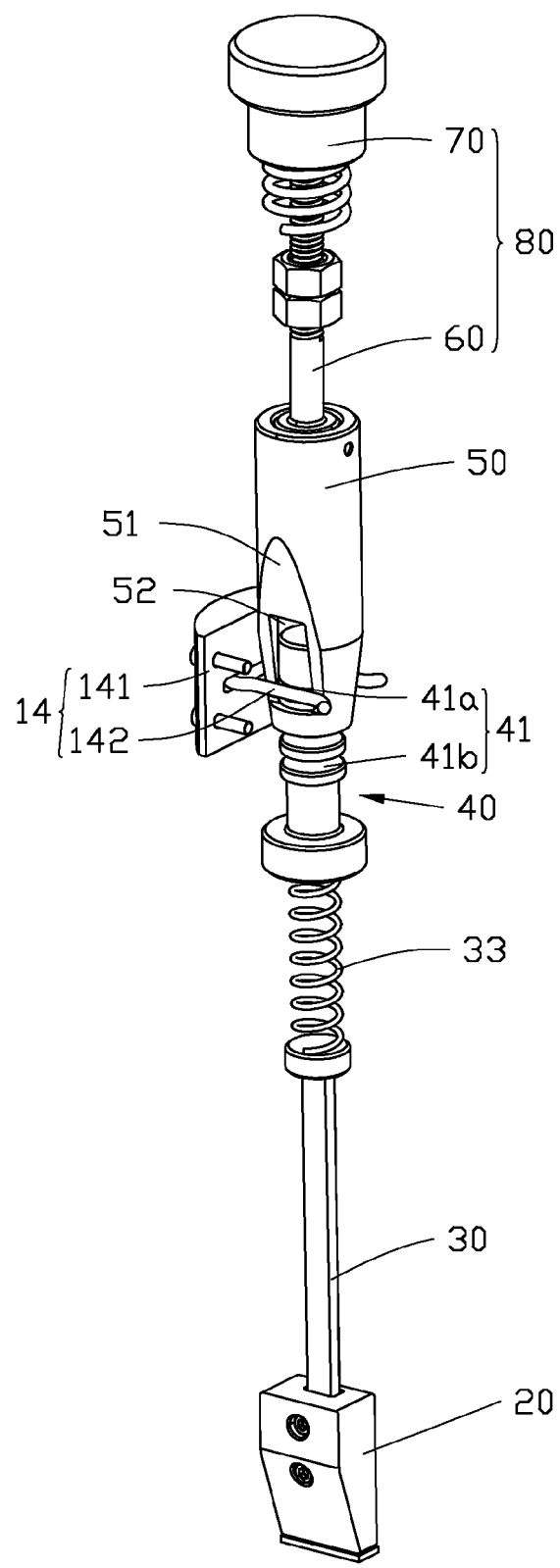
FIG. 5 is assembled, isometric view of the over-loading protection pressing device without a housing.

FIGS. 1-5 illustrate that an over-loading protection pressing device 100 includes a housing 10, a pressing head 20 protruding from the housing 10, a protection portion 40 fixed in the housing 10, and a supporting pole 30 connecting the protection portion 40 and the pressing head 20. The supporting pole 30 connects with the protection portion 40 elastically. The protection portion 40 is fixed onto the housing 10 via a clamping portion 14.

The housing 10 is substantially pen-shaped. The housing 10 includes an outer wall 111 and an inner wall 112 with a stepped hole defined inside the inner wall 112. The stepped hole is illustrated as a first hole 11, a second hole 12 and a third hole 13. The clamping portion 14 is mounted on the housing 10. The clamping portion 14 includes a mounting block 141 and a clamp 142. The clamp 142 is configured for clipping the protection portion 40.

The clamp 142 extends from the mounting block 141. The clamp 142 penetrates inwardly from the inner wall 111 of the housing 10. The mounting block 141 can be coupled to the housing 10. In this embodiment, a groove 15 is defined on the outer wall 111 of the housing 10. A plurality of fixing hole 151 and a slot 152 are defined in the groove 15. The mounting block 141 is embedded in the groove 15 and fixed onto the housing 10 via the fixing hole 151. In this embodiment, the clamp 142 is substantially U-shaped. The protection portion 40 is clipped in the clamp 142.

The pressing head 20 is coupled to an end of the supporting pole 30. In this embodiment, the pressing head 20 is substantially a trapeziform shape which has a larger top face 21 and a smaller bottom face 22. The bottom face 22 is used for attaching to an object. A shape of the pressing head 20 can be designed according to actual requirements.

The supporting pole 30 includes a column 31 and a hat 32. The column 31 penetrates from the first hole 11 of the housing 10. The column 31 includes a first end 311 and a second end 312 opposite to the first end 311. The hat 32 is formed on the second end 312 end of the column 31. The first end 311 of the column 31 is coupled to the pressing head 20. In this embodiment, a blind hole is defined in the pressing head 20. The first end 311 is inserted into the blind hole to be fixed onto the supporting pole 30. The supporting pole 30 is elastically connected with the protecting portion 40 via a first elastic element 33. In this embodiment, the first elastic element 33 is a compression spring.

The protection portion 40 is substantially a cylinder shape, and received in the third hole 13 of the housing 10. The protection portion 40 defines a plurality of recesses 41 peripherally around. The recesses 41 are annualar. The recesses 41 are arranged along an axis of the protection portion 40 and each are spaced from an adjacent one with predetermined distances. In this embodiment, the predetermined distances between adjacent recesses are the same. A diameter of a bottom of each recess is smaller than that of a periphery of the protection portion 40. Alternatively, the predetermined distances between adjacent recesses can be different and gradually decreasing along the axis of the protection portion 40. The recesses 41 include a first recess 41a away from the pressing head 20, a second recess 41b closer to the pressing head 20 than the first recess 41a, and a plurality of middle recesses arranged between the first recess 41a and the second recess 41b. The first recess 41a is located at a first position, and the second recess 41b is located at a second position. The clamp 142 of the clamping portion 14 can be movably clamped on the recesses 41. When a pressure is applied on the housing 10 along the axis thereof, the clamp 142 will be forced to move from one recess 41, for example the first recess 41a, to another recess 41, for example the second recess 41b, with deformation under a different diameter between the recesses 41 and the periphery of the protection portion 40. In other words, the clamp 142 of the clamping portion 14 can move from the first position to the second position when under pressure.

A cap 42 is formed on the protection portion 40. The cap 42 faces the supporting pole 30. The elastic element 33 is abutted between the cap 42 of the protection portion 40 and the head 32 of the supporting pole 30. The elastic element 33 is received in the second hole 12 of the housing 10.

When the over-loading protection pressing device 100 is in use, a user holds the housing 10 of the over-loading protection pressing device 100 and applies a pressure downward on the housing 10 to make the pressing head 20 press on an object. The clamp 142 of the clamping portion 14 is clipped on the first position which is the first recess 41a. The pressure can force the housing 10 to drive the protection portion 40 to push the first elastic element 33 via the clamp 142. The first elastic element 33 will be deformed under the pressure and further force the pressing head 20 to press on the object (not shown). Meanwhile, the first elastic element 33 also pushes the protection portion 40 inversely. When the pressure is in a predetermined range, the pressure is not large enough to force the first elastic element 33 to further push the protection portion 40 upwardly. The clamp 142 of the clamping portion 14 is still clipped on the first position which is the first recess 41a. When the pressure is over a predetermined range, the pressure is large enough to force the first elastic element 33 to further push the protection portion 40 and drive the protection portion 40 to move upwardly with respect to the housing 10. Then, the clamp 142 of the clamping block 14 will move from the first recess 41a downwardly to another recess away from the first recess 41a, such as one of the middle recesses or the second recess 41b, with a deformation. An over-loading pressure is used against a deformation of the clamp 142, therefore the over-loading pressure is apportioned to the protection portion 40 and the clamp 142 to avoid pressing directly on the object which will result in damage. Meanwhile, the user will feel that the housing is sinking and reduce the pressure.

The over-loading protection pressing device 100 can also include an automatic returning assembly 80. The automatic returning assembly 80 can include a guiding tube 50, a connecting pole 60 and a button 70. The connecting pole 60 connects the guiding tube 50 and the button 70.

The guiding tube 50 is sleeved on the protection portion 40. The guiding tube 50 embeds an end of the protection portion 40 opposite to the cap 42. The guiding tube 50 is substantially cylinder-shaped. The guiding tube 50 includes at least one inclined surface 51. The inclined surface 51 slants outward from an end of the guiding tube 50 adjacent to the protection portion 40 towards the other end of the guiding tube 50 away from the protection portion 40. An opening 52 is defined on the inclined surface 51. The protection portion 40 protrudes from the opening 52. The clamp 142 rests on the inclined surface 51 and clips on the recess 41 of the protection portion 40 through the opening 52. The clamp 142 can move along the inclined surface 51. In this embodiment, a number of the inclined surface 51 is two. The two inclined surfaces 51 are formed symmetrically on the guiding tube 50 to make the guiding tube 50 a cuniform shape.

The button 70 is elastically connected the housing 10. The connecting pole 60 is configured for connecting the guiding tube 50 and the button 70. In this embodiment, a plurality of outer screw threads 61 are formed on an end of the connecting pole 60. A plurality of inner screw threads (not labeled) are formed in a bottom portion of the button 70. The connecting pole 60 is fixed onto the button 70 via the outer screw threads 61 of the connecting pole 60 and the inner screw threads of the button 70. A base 62 having a larger diameter than that of the connecting pole 60 is formed on the other end of the connecting pole 60 opposite to the outer screw threads 61. A through hole 63 is defined radially on the base 62. A connecting hole 53 is defined on the guiding tube 50 respecting to the through hole 63. A fixing shaft 64 is inserted in the through hole 63 and the connecting hole 53 to connect the connecting pole 60 and the protection portion 50. When a downward pressure is applied on the connecting pole 60, the connecting pole 60 moves downward along with the guiding tube 50. Meanwhile, the clamp 142 moves on the inclined surface 51 of the guiding tube 50, and is deformed to largen and return from the second recess 41b to the first recess 41a.

The button 70 is elastically coupled to the housing 10. In this embodiment, a second elastic element 71 is abutted between the button 70 and the housing 10. The second elastic element 71 can be a spring. When the over-loading protection pressing device 100 is not needed to press the object, the user can press the button 70 to bring the protection portion 40 to return normally.

It is to be further understood that even though numerous characteristics and advantages have been set forth in the foregoing description of embodiments, together with details of the structures and functions of the embodiments, the disclosure is illustrative only; and that changes may be made in detail, according in matters of shape, size, and arrangement of parts within the principles of the disclosure to the full extent indicated by the broad general meaning of the terms in which the appended claims are expressed.

The embodiments shown and described above are only examples. Many details are often found in the art such as the other features of an over-loading protection pressing device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An over-loading protection pressing device adapted for pressing an object comprising:
   a housing having a clamping portion fixed thereon;
   a pressing head protruding from the housing and configured for pressing the object; and a protection portion is configured to be received in the housing and coupled to the pressing head via a supporting pole, the protection portion being clamped by the clamping portion, wherein when a pressure along a lengthwise direction of the housing is in a predetermined range, the clamping portion is clipped on a first position of the protection portion and when the pressure is over a predetermined range, the clamping portion can move from the first position to a second position;

wherein the clamping portion comprises:

a mounting block fixed on the housing, and a clamp extending from the mounting block and penetrating from an inner wall of the housing;

wherein the clamp is substantially U-shaped.

2. The over-loading protection pressing device of claim 1, wherein the protection portion is clamped by the clamp at the first position or the second position.

3. The over-loading protection pressing device of claim 1, wherein the protection portion defines a plurality of recesses peripherally around, a diameter of a bottom of each recess is smaller than that of a periphery of the protection portion.

4. The over-loading protection pressing device of claim 3, wherein the recesses comprises:

a first recess away from the pressing head; and a second recess closer to the pressing head than the first recess, wherein the first recess is located at the first position and the second recess is located at the second position.

5. The over-loading protection pressing device of claim 3, wherein the recesses are arranged along an axis of the protection portion and each are spaced from an adjacent one with predetermined distances.

6. The over-loading protection pressing device of claim 5, wherein the predetermined distances between adjacent recesses are the same.

7. The over-loading protection pressing device of claim 1, wherein a groove is defined on the housing, and the mounting block is embedded in the groove to be fixed onto the housing.

8. The over-loading protection pressing device of claim 7, wherein a plurality of fixing holes and a slot are defined in a bottom of the groove, the mounting block is fixed onto the housing via the fixing holes, and the clamp penetrates the slot to protrude the inner wall of the housing inwardly.

9. The over-loading protection pressing device of claim 1, wherein the supporting pole is elastically connected with the protecting portion via a first elastic element.

10. The over-loading protection pressing device of claim 9, wherein the first elastic element is abutted between the protection portion and the supporting pole, and the first elastic element is a compression spring.

11. The over-loading protection pressing device of claim 9, wherein a hat is formed on the supporting pole, a cap is formed on the protection portion, the hat and the cap face each other, and the first elastic element is abutted between the hat and the cap.

12. The over-loading protection pressing device of claim 1, further comprising an automatic returning assembly comprising:

a guiding tube;

a connecting pole;

and a button, wherein the connecting pole connects the guiding tube and the button, and the guiding tube is sleeved on the protection portion.

13. The over-loading protection pressing device of claim 12, wherein the guiding tube comprises at least one inclined surface, and the inclined surface slants outward from an end of the guiding tube adjacent to the protection portion towards the other end of the guiding tube away from the protection portion.

14. The over-loading protection pressing device of claim 13, wherein an opening is defined on the inclined surface, the protection portion protrudes from the opening.

15. The over-loading protection pressing device of claim 14, wherein the clamp rests on the inclined surface and clips on the first position of the protection portion through the opening, the clamp can move along the inclined surface, when a downward pressure is applied on the connecting pole, the connecting pole moves downwards along with the guiding tube, meanwhile, the clamp moves on the inclined surface of the guiding tube, and is deformed to largen and return from the second position to the first position.

16. The over-loading protection pressing device of claim 13, wherein a number of the inclined surface is two, and the two inclined surfaces are formed symmetrically on the guiding tube to make the guiding tube a cuniform shape.

17. The over-loading protection pressing device of claim 13, wherein the button is elastically connected upon the housing, and is pressed to return the protection portion to a normal position.

18. The over-loading protection pressing device of claim 17, wherein a second elastic element is abutted between the button and the housing.

* * * * *